United States Patent [19]
Schewe

[11] Patent Number: 4,675,766
[45] Date of Patent: Jun. 23, 1987

[54] COMBINED MAGNETIC WRITE AND READ HEAD FOR A RECORDING MEDIUM WHICH CAN BE MAGNETIZED PERPENDICULARLY

[75] Inventor: Herbert Schewe, Herzogenaurach, Fed. Rep. of Germany

[73] Assignee: Siemens Aktiengesellschaft, Berlin and Munich, Fed. Rep. of Germany

[21] Appl. No.: 632,880

[22] Filed: Jul. 20, 1984

[30] Foreign Application Priority Data

Aug. 19, 1983 [DE] Fed. Rep. of Germany ....... 3330023

[51] Int. Cl.$^4$ .............................................. G11B 5/17
[52] U.S. Cl. .................................... 360/123; 360/125
[58] Field of Search ............................... 360/125–127, 360/119–120, 122, 123, 110

[56] References Cited

U.S. PATENT DOCUMENTS 4,287,544  9/1981  Lazarri ................................ 360/131

FOREIGN PATENT DOCUMENTS 0034205  3/1979  Japan .................................... 360/119
0302745  7/1971  U.S.S.R. .............................. 360/111

OTHER PUBLICATIONS

IEEE Transactions on Magnetics: vol. Mag. 16, No. 1, Jan. 1980, pp. 71–76, vol. Mag. 16, No. 5, Sep. 1980, pp. 967–972, vol. Mag. 17, No. 6, Nov. 1981, pp. 2538–2540 and 3120–3122, vol. Mag. 18, No. 6, Nov. 1982, pp. 1158–1163 and 1170–1172.

Primary Examiner—John H. Wolff
Assistant Examiner—David J. Severin
Attorney, Agent, or Firm—Kenyon & Kenyon

[57] ABSTRACT

A combined magnetic write and read head for a recording medium to be magnetized perpendicularly comprises a magnetic conductor body for carrying the magnetic flux, the conductor body having two pole legs which are arranged one behind the other in the direction of relative motion of the head and medium and having a predetermined distance from each other. At least one coil winding is associated with the conductor body. In order to reduce problems regarding the mechanical design of such a head and to make possible at the same time a switchable write and read function having high efficiency, a separate coil winding is associated with each pole leg. The flux conduction directions in the pole legs are adjustable for the write function by means of the separate coil windings such that the flux directions extend, at the ends of the pole legs facing the recording medium, parallel at least to a high degree. Secondly, the magnetic fluxes in the pole legs may be adjusted in such a manner that, at the ends of the pole legs facing the recording medium, the magnetic flux in one of the pole legs is smaller and of a direction opposed to that of the magnetic flux in the other pole leg.

12 Claims, 4 Drawing Figures

COMBINED MAGNETIC WRITE AND READ HEAD FOR A RECORDING MEDIUM WHICH CAN BE MAGNETIZED PERPENDICULARLY

BACKGROUND OF THE INVENTION

The present invention relates to magnetic read and write heads and particularly to a combined magnetic write and read head for a recording medium wherein the medium is provided with at least one magnetizable storage layer which contains a magnetically anisotropic material, of which the axis of easy magnetization is aligned substantially perpendicularly to the surface of the medium, and on which information can be written along a track by perpendicular magnetization of the storage layer. The magnetic head further comprises a magnetic conductor body for carrying the magnetic flux having two pole legs which are arranged one behind the other in the direction of motion of the head and having a predetermined distance from each other, and with which at least one coil winding is associated, wherein, for performing the read function, the directions of the flux guidance in the two pole legs extend, at least substantially, antiparallel at their ends facing the recording medium. Such a magnetic head is known from DE-OS No. 29 24 013, corresponding to U.S. Pat. No. 4,287,544.

The principle of perpendicular magnetization for the storage of information is generally known. See, for instance, "IEEE Transactions on Magnetics", vol. MAG-16, No. 1, January 1980, pages 71 to 76, or the above-mentioned DE-OS No. 29 24 013. To utilize this principle, which is often also called vertical magnetization, special recording media are required such as a rigid magnetic storage disc, a flexible individual disc (floppy disc) or magnetic tape. Such a recording medium has at least one magnetizable storage layer of predetermined thickness, which contains a magnetically anisotropic material, particularly of a CoCr alloy, of which the axis of easy magnetization is perpendicular to the surface of the medium. By means of a separate write head, the individual bits of information are then written along a track in successive sections, also called cells or blocks, by magnetizing the storage layer. In practice, the magnetic flux reversals, i.e., the transitions from one direction of magnetization to the opposite one, are generally used as information bits. The sections have a predetermined extent in the longitudinal direction of the track, also called wavelength. This dimension can be substantially smaller as compared to the limit given in the method of longitudinal storage by demagnetization, so that the information density in the recording medium can advantageously be increased by the principle of vertical magnetization.

With this principle of vertical magnetization, however, problems arise in the development of suitable combined write/read heads, since, particularly, with these heads, the desired formation of the flux in a circuit with low magnetic resistance which is closed as far as possible, causes difficulties.

A suitable combined write/read head, i.e., a magnetic head, with which the write as well as read function can be performed, has in general, a so-called main pole by which a sufficiently strong vertical magnetic field is generated for the magnetic reversal of the individual sections in the storage layer. The necessary return for the flux can then be provided, for instance, by a so-called auxiliary pole on the opposite side of the recording medium. See the above cited literature reference "IEEE Trans. Magn.", vol. MAG-16. In addition, a return by leakage flux is also known See "IEEE Trans. Magn.", vol. MAG 18, No. 6, November 1982, pages 1170 to 1172.

A return can also be provided by a separate auxiliary pole which is located on the same side as the main pole. See "IEEE Trans. Magn.", vol. MAG-17, No. 6, November 1981, pages 3120 to 3122, vol. MAG-18, No. 6, November 1982, pages 1158 to 1163, or the DE-OS No. 29 24 013 mentioned above. Accordingly, the magnetic write and read head known from DE-OS No. 29 24 013 contains, on its forward end face, in the direction of motion of the recording medium moving away under it, an auxiliary pole and on its back side, the main pole proper. This main pole is formed by a pole leg which comprises substantially a thin pole piece which is arranged perpendicularly to the direction of motion and is applied to a nonmagnetic substrate. The auxiliary pole which is longer as seen in the direction of motion and which is located ahead of the main pole, forms a pole leg which is composed of several thin pole pieces arranged perpendicularly to the direction of motion with interposed insulating layers and which is separated from the main pole by an air gap. The extent of this air gap is relatively large and is, for instance, on the order of 5 to 10 $\mu$m. An electrical winding is located in the air gap, by which the main pole is excited for the write function and, for the read function, the excitation of the main pole can be registered. The auxiliary pole serves in any case only for the return of the flux. Possible concurrent writing of the auxiliary pole can be tolerated since the writing main pole always follows it and thereby overwrites information that may have been written by the auxiliary pole, if the width of the auxiliary pole is not larger than that of the main pole, and thus, already written adjacent tracks remain uninfluenced. In addition, the larger cross section of the auxiliary pole as compared to the main pole and the relatively large extent of the air gap also are necessary in order to ensure a far-reaching reduction of the magnetic flux density at the auxiliary pole. Concurrent reading of the auxiliary pole, however, can lead to difficulties in the detection of the information.

The remaining space of the air gap which is not filled by the electrical winding and is facing the recording medium, must be filled with a so-called insulating gap layer. This gap layer should consist of a material as hard as possible such as $Al_2O_3$ in order to avoid notching or washouts during the manufacture of the head, since such unevenesses can lead to a crash of the magnetic head which is guided over the recording medium with extremely little spacing, due to deposited dirt particles. It has been found, however, that the preparation of this gap layer disposed between the main and the auxiliary pole is extremely difficult.

Because of the mentioned difficulties in reading with the known combined read and write head, the functions of writing and reading can also be performed with separate heads so that then these heads can be optimally adapted to the respective function. See, for instance, "IEEE Trans. Magn.", vol. MAG16, No. 5, September 1980, pages 967 to 972. For reading, ring heads known per se can be used, while the writing must be carried out with special heads. Such a write head has, for instance, on its side facing the storage layer of the recording medium, a main pole, also called a single-pole head, with a longitudinal extent of, for instance, 3 μm, opposite which a substantially larger auxiliary pole is arranged on the back side of the recording medium. The second head, required only for reading, is a known ring head and has a gap width of, for instance, 0.2 μm. See "IEEE Trans. Magn." vol. MAG-17, No. 6, November 1981, pages 2538 to 2540. Such devices for reading and writing, with special heads adapted to the respective function, are relatively expensive from a mechanical design point of view, however.

SUMMARY OF THE INVENTION

It is an object of the present invention to provide an improved magnetic write or read head wherein the mentioned problems in such combined heads are decreased with respect to their mechanical design, and, secondly, wherein a switchable write and read function with high efficiency is assured.

These and other objects of the present invention are achieved in a combined magnetic read and write head wherein a separate coil winding is associated with each pole leg and wherein for performing the write function, the flux guidance directions in the pole legs can be adjusted by means of these coil windings in such a manner that these directions are substantially parallel at the ends facing the recording medium.

The advantages obtained with this embodiment of the magnetic head are, that due to the uniform directions of magnetization in the two pole legs, the magnetic fields issuing at their ends reinforce each other with respect to their vertical components, so that the magnetic head writes the information into the recording medium quasi as a single-pole head. The distance between the pole leg ends can therefore also be kept very small, for which reason the head also has good read properties and the danger of washouts of the gap formed between these ends is eliminated at least to a large extent.

According to one embodiment of the invention, a separate coil winding is associated with each pole leg. When performing a write function, by means of these coil windings, the magnetic fluxes in the pole legs can be adjusted in such a way that, at the ends facing the recording medium, the magnetic flux in one of the pole legs is smaller and its direction is opposed to the magnetic flux in the other pole leg. In this manner a magnetic field with a very pronounced vertical component which serves for writing the information into the recording medium can advantageously be concentrated in the one leg.

Other objects, advantages and features of the present invention will be apparent from a reading of the detailed description below.

BRIEF DESCRIPTION OF THE DRAWINGS

The invention will be described in greater detail in the following detailed description with reference to the drawings, in which.

DETAILED DESCRIPTION

Figure 1:
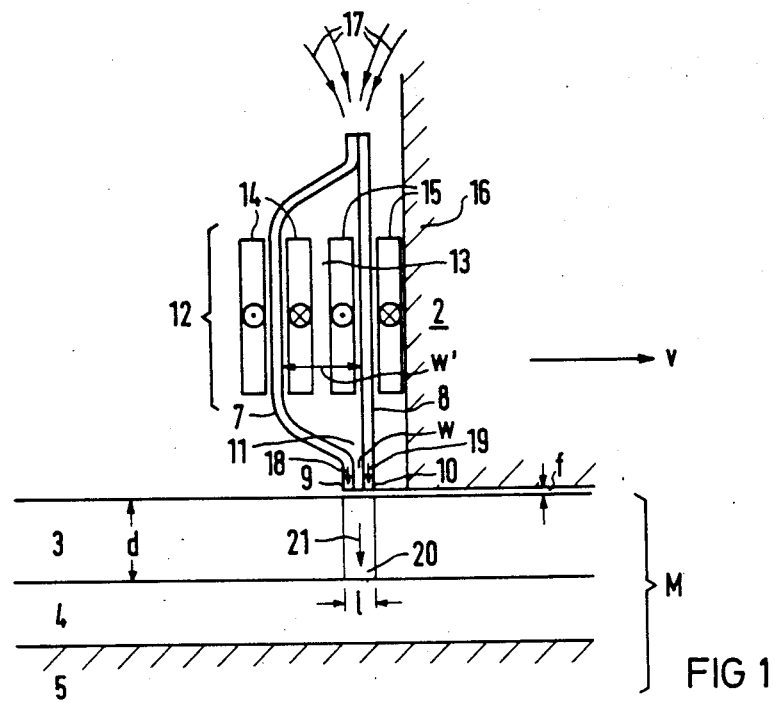
FIGS. 1 and 2 show a longitudinal sectional view of a magnetic head according to the invention for two different types of magnetic writing.

With reference now to the drawings, in the combined magnetic write and read head according to the invention shown in FIG. 1 in longitudinal sectional view, a known head is taken as the starting point, such as from, for instance, DE-OS No. 29 24 013 mentioned above. The head, which is designated generally by 2, and which is shown during its write function according to the principle of perpendicular or vertical magnetization, is located, for instance, at the end face or on the back side of a customary aerodynamic body which is not detailed in the figure. The head is relatively guided at a small flight height f of, for instance, 0.2 μm above the recording medium M. For instance, the recording medium may be moved under the magnetic head. The relative direction of motion of the magnetic head 2 with respect to the recording medium M is indicated by a line and arrow designated v. The recording medium M, for instance, a magnetic storage disc, may comprise a storage layer 3, preferably of a CoCr alloy having a predetermined thickness d. This layer can optionally be connected, on its side facing away from the magnetic head 2, to a magnetically soft layer 4, for instance, of a special NiFe alloy. The storage layer 3 and, if applicable, the layer 4, are deposited on the upper flat side of a carrier body 5 of the recording medium M.

The magnetic head 2 has two pole legs 7 and 8 which are aligned, especially at their ends 9 and 10 facing the recording medium M, at least approximately perpendicularly to the surface of the recording medium M. Between the pole leg ends, an air gap 11 is formed having an advantageously small longitudinal width w along the direction of motion of less than 1 μm, and in particular less than 0.3 μm. In a central region 12, the distance between the two pole legs 7 and 8, w', is enlarged or made wider than the gap width w, in that, for instance, the rear pole leg 7 (with respect to the direction of motion) is curved with respect to the forward pole leg 8, which is made straight. Because of the space 13 between the legs 7 and 8 formed in this manner, according to the invention, each pole leg may be surrounded in the region 12 by respective coil windings 14 and 15. Outside this region, on the side facing away from the recording medium M, the pole legs are joined together as shown.

In the manufacture of the magnetic head 2 by a thin-film technique, a substrate 16 is generally used which comprises, for instance, TiC and $Al_2O_3$. If required, the substrate 16 can be provided with a sufficiently thick insulating layer, for instance, of $Al_2O_3$. For the construction of the pole legs 7 and 8, thin magnetic layers of a magnetically soft material, for instance, special NiFe alloys such as Permalloy (Ni/Fe-81/19) or of FeB are first applied by sputtering, vapor deposition or electroplating and are separated from each other by a nonmagnetic intermediate layer, for instance, $SiO_2$ or $Al_2O_3$. The magnetization of these magnetic layers lies in the layer plane. Due to the manufacturing process, the magnetic layers have uniaxial anisotropy, i.e., each magnetic layer has two anisotropic axes turned 90°, which are designated as the easy and difficult (hard) directions of magnetization, respectively. The magnetization is preferably parallel or antiparallel to the easy direction. The easy direction of the magnetic layers can be induced, for instance, when the respective layer is deposited, by an applied magnetic field.

The different grown-on layers are structured by techniques known per se such as photolithography, plasma, ion beam or wet chemical etching, and the two pole legs 7 and 8 of the magnetic head 2 are made thereby. The easy direction of magnetization of the magnetic layers is generally always provided perpendicularly to the direction of the magnetic flux in the pole legs, i.e., substantially parallel to the surface of the recording medium M in the vicinity of the ends 9 and 10. After the one pole leg 8 is deposited, an insulating layer, for instance, SiO$_2$ is applied and subsequently the coil windings 14 and 15 are made or structured which are required for reading in and/or out the data in the magnetic storage layer 3 of the recording medium M. These windings comprise, for instance, Cu, Au or Al. Since uneven magnetic layers cause a degradation of their magnetic properties, the coil windings 14 and 15 can optionally be finished by means of polyimide varnish. Subsequently, the second pole leg 7 is applied and structured. Finally, a relatively thick protective layer, for instance, of Al$_2$O$_3$, may be applied for the protection of the magnetic thin-film head.

With the magnetic head 2 shown in FIG. 1, a write function is about to be executed. According to the invention, the two coil windings 14 and 15 are excited for this purpose, on the basis of the current-flow directions shown in the figure, in such a manner that the magnetic fluxes in the pole legs 7 and 8 associated with them extend substantially parallel. The flux pattern obtained on the side of the pole legs facing away from the recording medium M is indicated by arrows 17. At the two ends 9 and 10 of the pole legs 7 and 8, there therefore occurs, due to the magnetic fluxes or magnetizations illustrated by arrows 18 and 19, magnetic fields, each having a pronounced perpendicular (vertical) component, by which a corresponding information is written by appropriate magnetization of the storage layer 3 of the recording medium M. At the ends 9 and 10, the pole strength can advantageously be about equal, i.e., approximately the same magnetic flux prevails. Also, the magnetic flux densities at the pole leg ends should have approximately the same magnitudes so that the pole leg ends then have approximately the same cross-sectional areas. The magnetization in the section 20 of the storage layer 3 so described, is illustrated by arrow 21. While the longitudinal dimension 1 of this storage section 20 is shown to be on the order of the corresponding distance between the outer edges of the pole leg ends 9 and 10, this dimension 1 is generally smaller, so that in practice a higher information density can be obtained in the recording medium M by the magnetic head 2 according to the invention than would correspond to the geometric extent of the two pole legs. See, for instance, also "IEEE Trans. Magn.", vol. MAG-17, No. 6, November 1981, pages 2538 to 2540.

Figure 2:
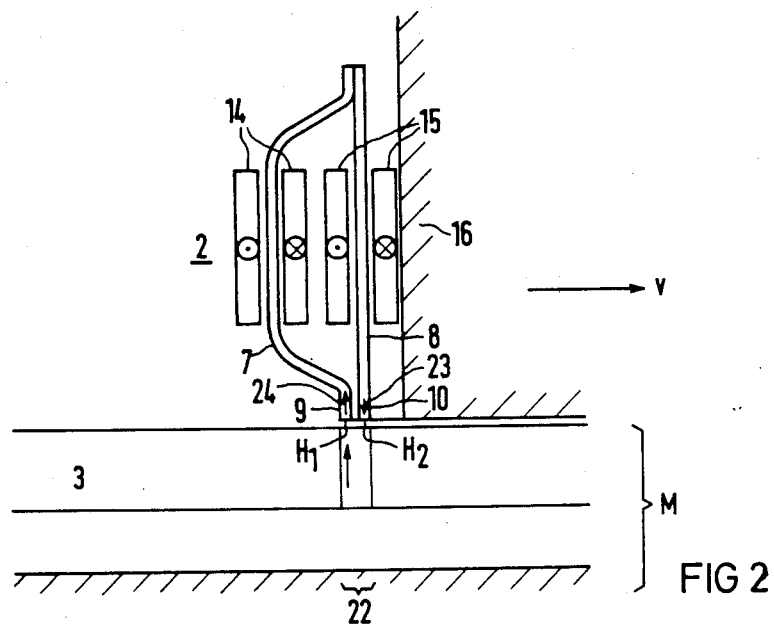

In the embodiment of the magnetic head 2 according to the invention shown in FIG. 1 during a write function, both pole legs 7 and 8 of the magnetic head have the same direction of flux and magnetization 18 and 19 at their ends 9 and 10. This is achieved by appropriate excitation of the two coil windings 14 and 15. It is also possible, however, with antiparallel magnetization of the pole leg ends 9 and 10, to write information into the storage layer 3 of the recording medium M if special field strength conditions at the pole leg ends are observed. This is indicated in FIG. 2 wherein like components are provided with like reference symbols as in FIG. 1. In contrast to the mode of operation of the magnetic head 2 shown in FIG. 1, information is written, according to FIG. 2, in a section 22 of the storage layer 3 of the recording medium M by vertical magnetization substantially only by means of the end 9 of the rear pole leg 7 as seen in the direction of motion, i.e., the write function of the pole leg 8 on the end face is largely suppressed. This can be achieved by the provision that, in addition to the magnetic flux caused by the coil winding 14 also in the pole leg 8 directed toward the storage layer 3, a sufficiently large magnetic counter flux is generated by means of the coil winding 15. The flux resulting therefrom, or the magnetization in the pole leg 8 at the end 10, indicated by arrow 23, is then opposed to the flux at the end 9 or to the magnetization 24 of the coil 14, and is substantially smaller. The currents in the coil windings 14 and 15 must therefore be chosen so that the vertical magnetic field component H$_1$ leaving at the end 9 of the pole leg 7 is magnitude-wise larger than the coercivity field strength H$_c$ of the storage layer 3, and the vertical magnetic field component H$_2$ at the end 10 of the pole leg 8 is magnitude-wise substantially smaller than the coercivity field strength H$_c$. In this manner that part generated by the coil winding 14 which would be lost by basically undesirable stray fields can be kept relatively small when writing, and thereby the writing vertical magnetic field component generated by the magnetic head is increased accordingly.

Figure 3:
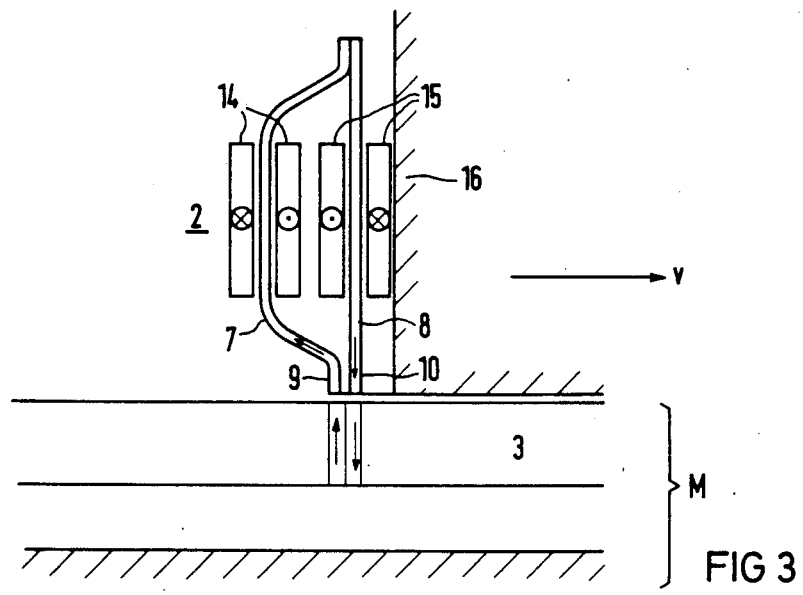
FIG. 3 shows the magnetic head of FIGS. 1 and 2 during reading.

FIG. 3 shows the magnetic head 2 shown in FIGS. 1 and 2 in a corresponding presentation when reading, with like parts having like reference symbols. For the read function, the coil windings 14 and 15 are advantageously connected in series so that the voltages induced in them add up. The detection can, of course, also be made with only one of the coil windings.

Figure 4:
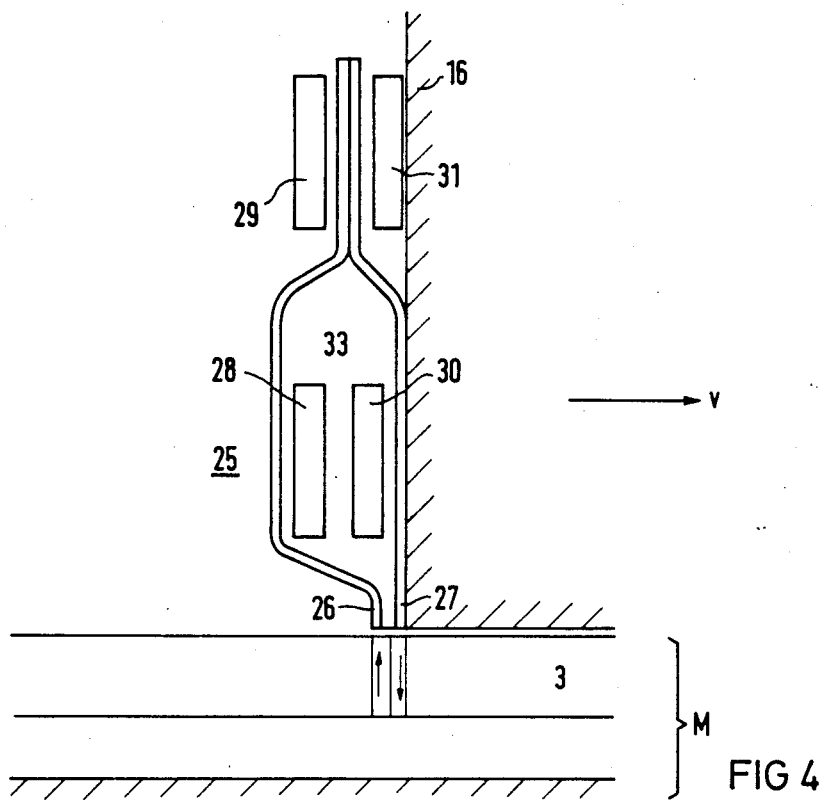
FIG. 4 illustrates a further embodiment of a magnetic head according to the invention during reading.

A further embodiment of the magnetic head according to the invention is shown in FIG. 4 in a corresponding presentation during its read function. This magnetic head, designated generally by 25, differs from the magnetic head 2 according to FIGS. 1 to 3 essentially only by the fact that the coil windings associated with the two pole legs 26 and 27 each have two winding sections 28, 29 and 30, 31, respectively. The winding sections 28 and 30 are housed in a space 33 formed between the two pole legs 26 and 27. On the upper side, facing away from the recording medium M, where the two pole legs 26 and 27 are joined together, the two winding sections 29 and 31 are arranged separated from each other only by the pole legs. This embodiment has the particular advantage that a larger number of coil windings that must be arranged on top of each other is avoided, i.e., that the longitudinal extent of the magnetic head can be limited accordingly.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. In a combined magnetic write and read head for selectively performing a read and a write function with respect to a recording medium, the recording medium having at least one magnetizable storage which contains a magnetically anisotropic material having axes of easy and difficult (hard) magnetization, the axis of each magnetization being aligned substantially perpendicularly to the surface of the medium, information being writable into the medium along a track through perpendicular magnetization of the storage layer and wherein the magnetic head has a magnetic conductor body for guiding lines of magnetic flux, the conductor body having two pole legs which are arranged adjacently in a direction of relative motion of the head with respect to the medium and having a predetermined distance from each other between ends of the respective pole legs disposed adjacent the recording medium, at least one coil winding being associated with said conductor body, and wherein, for performing the read function, the directions of the lines of flux in the two pole legs extend substantially antiparallel along the pole legs at the ends of the pole legs facing the recording medium, the improvement comprising a further separate coil winding so that each pole leg is associated with one of said separate coil windings, wherein, for performing the write function, said separate coil windings are connected together in a first manner for generating predetermined directions of current flow in said separate coil windings, so that said directions of the lines of magnetic flux extend substantially parallel at said ends of the pole legs facing the recording medium, and wherein, for performing the read function, said separate coil windings are connected together in a second manner which is different from said first manner, the distance between the ends of the pole legs facing the recording medium being less than 1 $\mu$m, the distance between the pole legs increasing at a distance away from the ends of the pole legs facing the recording medium so that the distance is substantially larger than the distance between the ends of the pole legs facing the recording medium so as to form an enlarged space, and said separate coil windings each comprising two winding sections, one of said winding sections of each coil winding being disposed in the enlarged space and the other winding sections being disposed in a region wherein the pole legs are joined together on a side facing away from the recording medium.

2. The improvement recited in claim 1, wherein the two pole legs have, at the ends facing the recording medium, magnetic flux densities, the magnitudes of which are approximately equal.

3. The improvement recited in claim 1, wherein said pole legs comprise, at least in part, a magnetically soft material.

4. The improvement recited in claim 1, wherein said pole legs comprise a material having a direction of easy magnetization directed substantially perpendicular to the direction of conduction of the magnetic flux.

5. The improvement recited in claim 1, wherein at least one of said pole legs is deposited, at least partly, on a plane substrate body as a thin-film structure.

6. The improvement recited in claim 5, wherein said separate coil windings are applied to the substrate body, at least partly, as thin-film structures an at least one of said pole legs.

7. In a combined magnetic write and read head for selectively performing a read and a write function with respect to a recording medium, the recording medium having at least one magnetizable storage layer which contains a magnetically anisotropic material having axes of easy and difficult (hard) magnetization, the axis of easy magnetization being aligned substantially perpendicularly to the surface of the medium, information being writable into the medium along a track by perpendicular magnetization of the storage layer and wherein the magnetic head has a magnetic conductor body for carrying lines of magnetic flux, the conductor body having two pole legs which are arranged adjacently in a direction of relative motion of the head with respect to the medium and having a predetermined distance from each other between ends of the respective pole legs disposed adjacent the recording medium, at least one coil winding being associated with said conductor body, and wherein, for performing the read function, the directions of the lines of flux in the two pole legs in the ends facing the recording medium extend substantially antiparallel along the pole legs, the improvement comprising a further separate coil winding so that each pole leg is associated with one of said separate coil windings, wherein, for performing the write function, said separte coil windings are connected together in a first manner for generating predetermined directions of current flow in said separate coil windings, so that the magnetic flux in an end of one of the pole legs facing the recording medium is smaller than the magnetic flux in an end of the other pole leg facing the recording medium and has directions of the lines of magnetic flux opposed to the lines of magnetic flux in the other pole leg, and wherein, for performing the read function, said separate coil windings are connected together in a second manner which is different from said first manner, the distance between the ends of the pole legs facing the recording medium being less than 1 $\mu$m, the distance between the pole legs increasing at a distance away from the ends of the pole legs facing the recording medium so that said distance is substantially larger than the distance between the ends of the pole legs facing the recording medium so as to form an enlarged space, and said separate coil windings each comprising two winding sections, one of said winding sections of each coil winding being disposed in the enlarged space and the other winding sections being disposed in a region wherein the pole legs are joined together on a side facing away from the recording medium.

8. The improvement recited in claim 7, wherein one of said pole legs is arranged in front of the other of said pole legs in the direction of relative motion, and wherein the magnetic flux in the pole arranged in front is smaller and of a direction opposed to the magnetic flux in the other pole leg end.

9. The improvement recited in claim 7, wherein said pole legs comprise, at least in part, a magnetically soft material.

10. The improvement recited in claim 7, wherein said pole legs comprise a material having a direction of easy magnetization directed substantially perpendicular to the direction of conduction of the magnetic flux.

11. The improvement recited in claim 7, wherein at least one of said pole legs is deposited, at least partly, on a plane substrate body as a thin-film structure.

12. The improvement recited in claim 11, wherein said separate coil windings are applied to the substrate body, at least partly, as thin-film structures on at least one of said pole legs.

* * * * *